United States Patent [19]

Baguena

[11] Patent Number: 4,700,672
[45] Date of Patent: Oct. 20, 1987

[54] TWO-FUEL INJECTOR APPARATUS FOR AN INTERNAL COMBUSTION ENGINE

[75] Inventor: Michel Baguena, Paris, France

[73] Assignee: S.E.M.T., S.A., Saint Denis, France

[21] Appl. No.: 24,704

[22] Filed: Mar. 11, 1987

[30] Foreign Application Priority Data

Mar. 14, 1986 [FR] France ............................... 86 03691

[51] Int. Cl.[4] ............................................ F02M 45/02
[52] U.S. Cl. ..................................... 123/299; 123/304
[58] Field of Search ............... 123/299, 300, 304, 575, 123/576, 577, 578

[56] References Cited

U.S. PATENT DOCUMENTS

| | | | |
|---|---|---|---|
| 4,033,314 | 7/1977 | Walton | 123/299 |
| 4,201,160 | 5/1980 | Fenne | 123/300 |
| 4,520,774 | 6/1985 | Sitter | 123/300 |
| 4,522,174 | 6/1985 | Babitzka | 123/300 |
| 4,530,337 | 7/1985 | Laufer | 123/300 |
| 4,590,904 | 5/1986 | Wannenwetsch | 123/300 |

Primary Examiner—Ronald B. Cox
Attorney, Agent, or Firm—Kenyon & Kenyon

[57] ABSTRACT

An injector apparatus for an internal combustion engine and suitable for injecting two different fuels, namely a "pilot injection" liquid fuel and a "main injection" liquid or gaseous fuel comprising a low-pressure pump (1B) for pilot injection fuel feed, a high-pressure pump (1A) of the injection pump type, two fuel injectors, and a metering pump (30) selectively connecting the low-pressure pump, the high-pressure pump, and the two fuel injectors. The metering pump (30) includes a transfer piston (2) and two abutments (3, 4) which are independently adjustable so as to vary the relative importance of pilot injection and of main injection and also vary the extent to which the two injection stages overlap.

9 Claims, 5 Drawing Figures

TWO-FUEL INJECTOR APPARATUS FOR AN INTERNAL COMBUSTION ENGINE

The present invention relates to an injector apparatus for an internal combustion engine, the apparatus being capable of injecting two fuels, namely a "pilot injection" liquid fuel and a "main injection" liquid or gaseous fuel, the injector apparatus comprising a low-pressure pump for pilot injection fuel feed, a high-pressure injection-type pump, two fuel injectors, and a metering pump selectively connecting the lowpressure pump, the high-pressure pump, and the two fuel injectors, said metering pump including a transfer piston with one of its faces delimiting a main volume in permanent communication with the high-pressure pump and with its other face delimiting a pilot volume in permanent communication with the low-pressure pump and with the pressure chamber of the pilot injection needle.

BACKGROUND OF THE INVENTION

Injector apparatuses of this nature already exist, for example, as described in German Pat. No. 3 330 772, in which the pilot injection and main injection sequences are fixed once and for all by construction and cannot be modified while the engine is operating. As a result, optimization performed for any given engine operating range is poorly adapted to other ranges, and there is no way of switching off the pilot injection stage or the main injection stage.

An aim of the present invention is to remedy these drawbacks by providing an injector apparatus capable of adjusting the beginnings and the durations of the main injection stages and of the pilot injection stages, regardless of the type of main injection fuel, i.e. regardless of whether it is a liquid or a gas.

SUMMARY OF THE INVENTION

With the particular aim of obtaining immediate main injection while switching off pilot injection, an injector apparatus in accordance with the invention includes the improvement of two independently-adjustable abutments each of which limits the stroke of said piston in a respective direction, with an extreme position of the main volume abutment preventing the transfer piston from covering an orifice putting the main volume into communication with the pressure chamber of the main injector needle, and with an abutment position of the pilot volume serving to block the transfer piston.

With the particular aim of obtaining main injection simultaneously with pilot injection, an injector apparatus in accordance with the invention includes the improvement of two independently-adjustable abutments limiting the stroke of said piston in respective directions, with an extreme position of the main volume abutment preventing the transfer piston from covering an orifice putting the engine volume into communication with the pressure chamber of the main injection needle, and a position of the pilot volume abutment enabling the piston to move over a certain stroke.

When the main injection fuel is a liquid fuel, the active sections subjected to the control pressure for raising the pilot injection needle and the main injection needle are identical, with both needles being pressed against their seats by a common rating element.

When the main injection fuel is a gaseous fuel under pressure, and where the gaseous fuel feed could be interrupted, for any reason whatsoever, the metering pump includes two orifices and a duct putting the two volumes controlled by the piston into communication with each other, with an extreme position of the main volume abutment and an extreme position of the pilot volume abutment putting these two volumes into permanent communication so that the transfer piston then prevents communication between the main volume and the pressure chamber of the main injection needle.

Preferably, the main injection needle includes a set of ducts putting the pressure chamber and a leak return circuit into communication when the needle is in a raised position, and a duct provided with a non-return valve enabling fluid to flow from the pressure chamber of the main injection needle towards the high-pressure pump so as to empty the pressure chamber.

The present invention also provides a metering pump for an injector apparatus for an internal combustion engine, said injector apparatus being capable of injecting two fuels, namely a "pilot injection" liquid fuel and a "main injection" liquid or gaseous fuel, the metering pump including a transfer piston with one of its faces delimiting a main volume in permanent communication with the high-pressure pump and with its other face delimiting a pilot volume in permanent communication with the low-pressure pump and with the pressure chamber of the pilot injection needle, wherein the metering pump is constituted by a body having a bore therein along which said piston slides between two abutments, each abutment being capable of sliding along the bore in order to adjust the stroke of the piston and each abutment including its own positionadjusting means.

When the main injection fuel is a gaseous fuel, the metering pump includes an orifice capable of being put into communication with the main volume, an orifice capable of being put into communication with the pilot volume, and a duct interconnecting said orifices.

BRIEF DESCRIPTION OF THE DRAWING

Embodiments of the invention are described with reference to the accompanying drawings, in which.

MORE DETAILED DESCRIPTION

Figure 1:
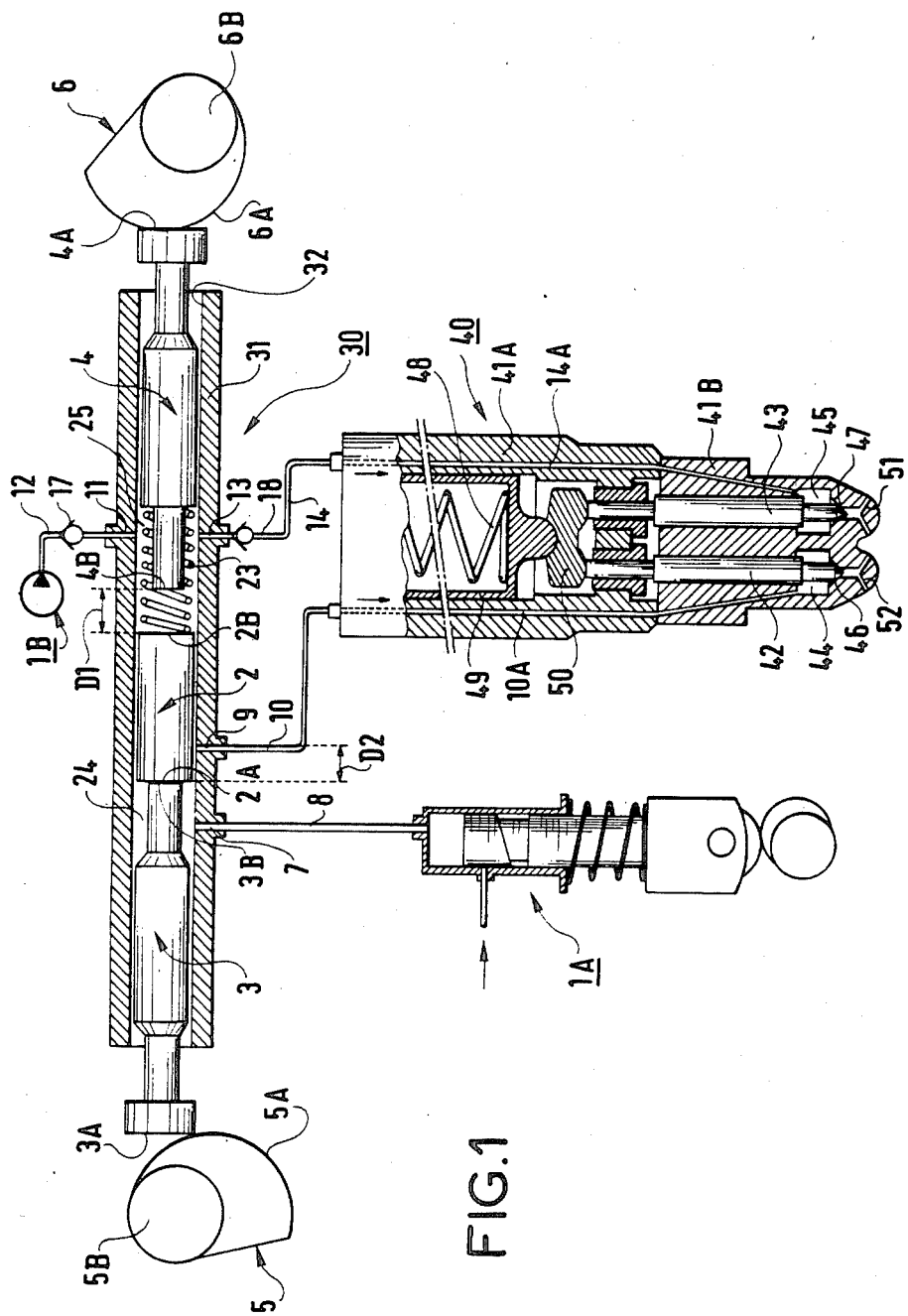
FIG. 1 shows a first injector apparatus together with its metering pump suitable for use with a liquid fuel as the main injection fuel.

In FIG. 1, a high-pressure pump 1A of the conventional injector pump type pumps main liquid fuel into a duct 8, and a low-pressure pump 1B pumps pilot injection liquid fuel into a duct 12 having a non-return valve 17 mounted therein, said nonreturn valve having a very low rated setting.

The duct 8 from the high-pressure pump 1A and the duct 12 from the low-pressure pump 1B are connected to a metering pump 30 which is in turn connected to an injector block 40.

The metering pump 30 comprises a body 31 having a bore 32 which slidably receives a transfer piston 2, together with two slidable abutments 3 and 4 which are mounted in sealed manner in the bore 32.

The end 3B of the abutment 3 and the end 4B of the abutment 4 determine respective limits on the displacement of the piston 2, with the face 2A of the piston coming into abutment with the end 3B of the abutment 3 and the face 2B of the piston coming into abutment with the end 4B of the abutment 4. The other end 3A of the abutment 3 presses against the active surface 5A of a cam 5, while the other end 4A of the abutment 4 presses against the active surface 6A of a cam 6.

The axes 5B and 6B of the cams 5 and 6 are fixed relative to the body 31. A compression spring 32 may be installed between the piston 2 and the abutment 4.

The piston 2 defines a main volume 24 in conjunction with the abutment 3 and it defines a pilot volume 25 in conjunction with the abutment 4.

An orifice 7 connected to the duct 8 puts the main volume 24 into communication with the working chamber of the high-pressure pump 1A. An orifice 9 connected to a duct 10, 10A puts the engine volume 24 into communication with a pressure chamber 44 controlling the opening of a main injection needle 42 in the injector block 40.

An orifice 11 connected to the duct 12 puts the pilot volume 25 into communication with the low-pressure source. An orifice 13 connected to a duct 14, 14A having a non-return valve 18 connected therein puts the pilot volume 25 into communication with the pressure chamber 45 controlling the opening of a pilot injection needle 43 in the injector block 40.

The injector block 40 comprises a body 41A having a nose 41B fixed thereto. The nose 41B contains the main injection needle 42 and the pilot injection needle 43, these two needles have the same dimensions and they co-operate with respective pressure chambers 44 and 45 and associated seats 46 and 47. A rating spring 48 inside the body 41A urges the needles 42 and 43 against their respective seats via a pusher 49 and a symmetrical rocker 50. Atomization is provided by two sets of injection nozzles 51 and 52.

Figure 2:
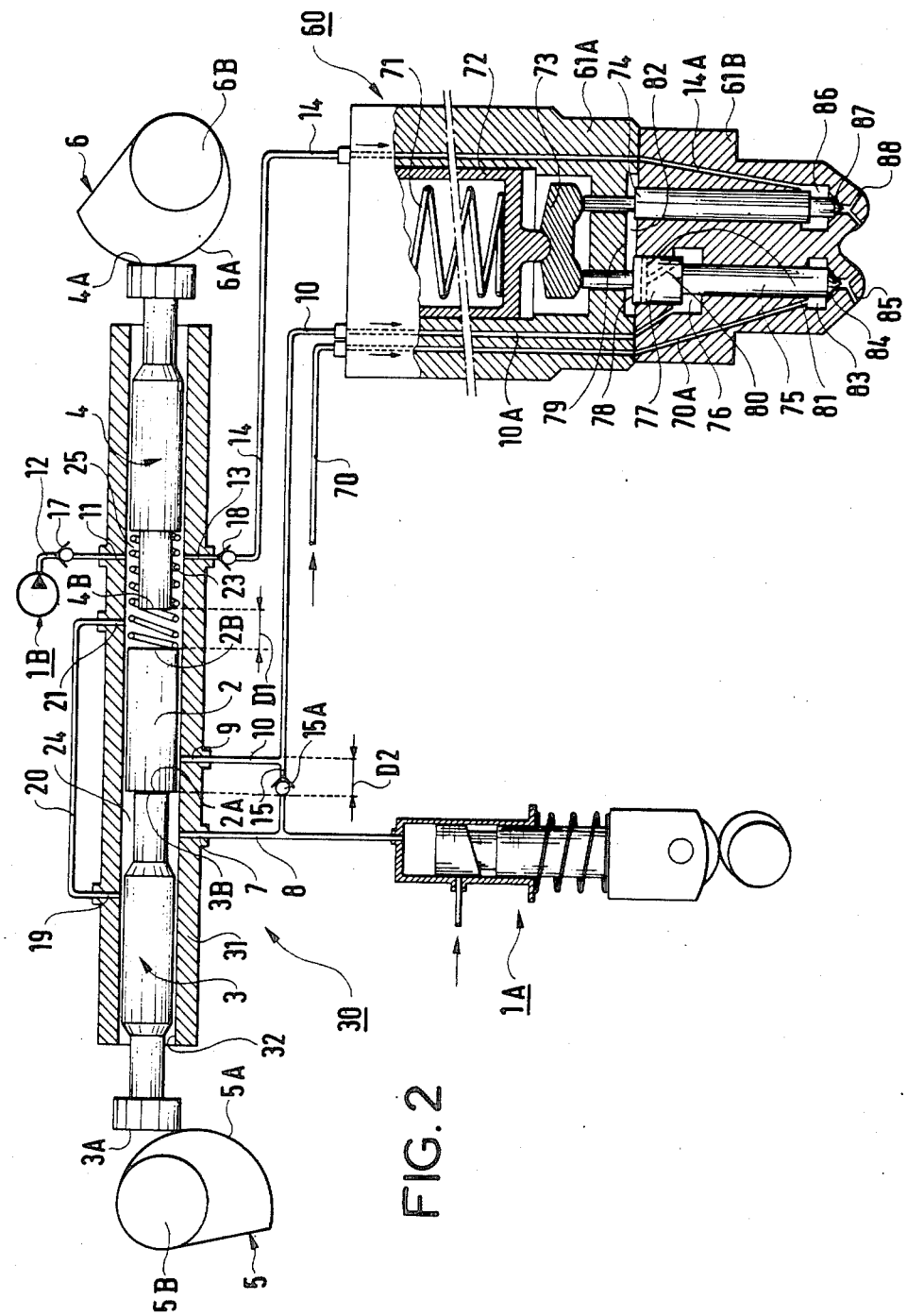
FIG. 2 shows a second injector apparatus together with its associated metering pump suitable for use with a gaseous fuel as the main injection fuel.

FIG. 2 shows an injector block 60 suitable for injecting a gaseous fuel. The injector block 60 comprises a body 61A and nose 61B. The nose 61B contains a needle 74 for pilot injection of liquid fuel, said needle co-operating with an associated pressure chamber 86 and seat 87. Atomizaton is provided by a series of injector nozzles 88. The pressure chamber 86 is connected to the pilot volume 25 via the duct 14, 14A and the orifice 13.

The nose 61B also contains a needle 75 for the gaseous fuel and co-operating with a feed chamber 83 and an associated seat 84. Atomization is provided by a series of injection nozzles 85. The chamber 83 is connected via a duct 70, 70A to a source of gas under high pressure (e.g. 250 bars), not shown. A pressure chamber 76 co-operates with a shoulder 77 on the needle 75. In the raised position, the face 78 of the needle 75 abuts against the face 79 of the body 61A, thereby allowing a series of ducts 80, 81 to put the pressure chamber 76 into communication with a leak return duct 82. The pressure chamber 76 is connected via the duct 10, 10A and the orifice 9 to the engine volume 24 of the metering pump. A spring 71 co-operates with a pusher 72 and a rocker 73 (which need not necessarily be symmetrical) to urge the needles 74 and 75 against their seats.

In this figure, the metering pump 30 includes two orifices 19 and 21 connected via a duct 20, with said duct and its orifices serving, under certain conditions described below, to provide communication between the main volume 24 and the pilot volume 25.

A duct 15 including a series-connected non-return valve 15A connects the ducts 8 and 10 and enables the pressure chamber 76 to be emptied, thereby enabling the main injection needle 76 to be closed.

Under the most commonly encountered operating conditions, as shown in FIGS. 1 and 2, injection takes place as follows.

Under the effect of the permanent pressure existing in the duct 12, optionally assisted by the spring 23, and in the absence of any outlet pressure coming from the pump 1A via the duct 8, the transfer piston 2 is pressed against the abutment 3 at the beginning of a cycle. The abutment 3 is disposed in such a manner that the piston 2 closes the orifice 9 and the abutment 4 is disposed in such a manner that said orifice 9 may be opened during movement of the piston 2. When the pump 1A pumps into the duct 8, the pressure set up in the main volume 24 pushes the piston 2 along the bore 32 and gives rise to identical pressure outlet of pilot injection fuel from the pilot volume 25 into the duct 14. This displacement of the pilot injection fuel continues until the piston 2 encounters the abutment 4. The resulting pilot injection volume thus depends on the distance D1 at the beginning of the cycle between the face 2B of the piston and the abutment 4. Further, the piston 2 moves further than the distance D2 between the face 2A of the piston 2 and the orifice 9. So long as the orifice 9 is masked by the piston 2, no pressure is applied to the duct 10, 10A. However, as soon as the face 2A of the piston 2 opens the orifice 9, the main fuel is injected into the duct 10 simultaneously with the pilot injection which continues until the piston 2 encounters the abutment 4. Main injection then continues until the pump 1A ceases to pump the main fuel.

It can thus be seen that by adjusting the distances D1 and D2 it is possible to vary the relative importance of pilot injection and of main injection and also to vary the extent to which these two injection stages overlap each other.

Figure 3:
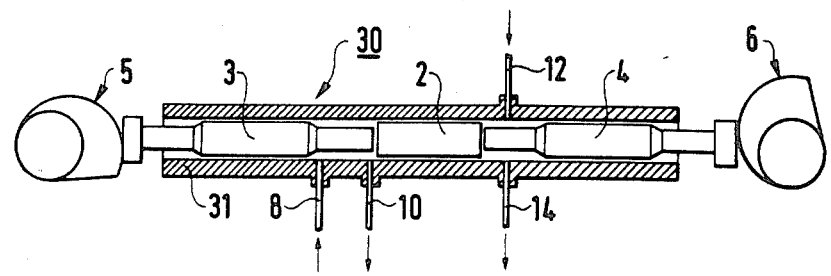
FIGS. 3 and 4 show various adjustments applicable to a metering pump regardless of whether the main injection fuel is liquid or gaseous.

FIG. 3 shows a first case in which the distances D1 and D2 are both zero. In this case, there is no pilot injection and main injection begins at once.

Figure 4:
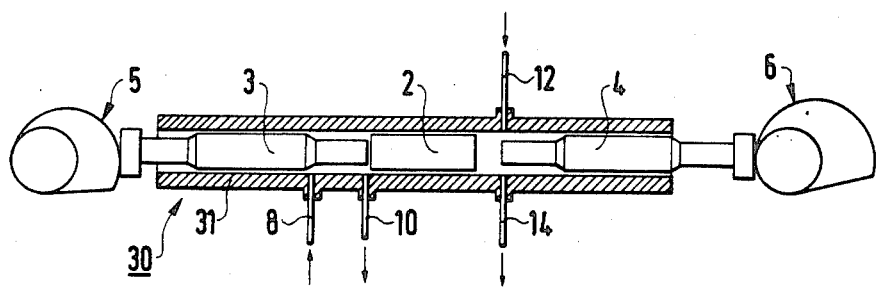

FIG. 4 shows another case in which the distance D2 is zero but in which the distance D1 is not zero. Both the pilot injection and the injection stages therefore start simultaneously, with the duration of pilot injection depending on the length of the distance D1.

Between these extremes, suitable choices for the distances D1 and D2 serve to adjust the pilot injection volume and the timing at which main injection begins.

If the distance D2 corresponds to a displacement volume of the piston 2 which is greater than the cylinder capacity of the pump 1A (as happens under light load), the main injection stage is eliminated and only the pilot injection stage remains.

Figure 5:
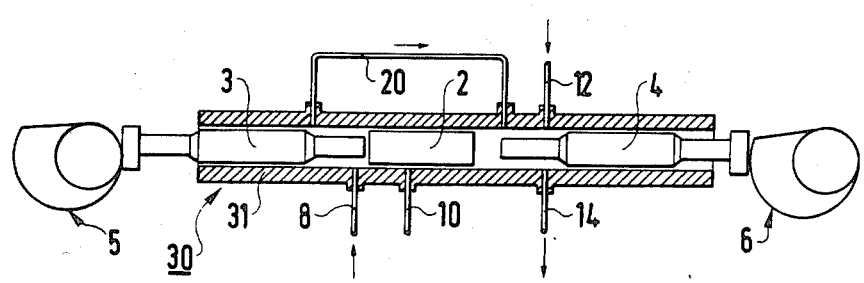
FIG. 5 shows an adjustment of a metering pump suitable for use with a main injection fuel which is gaseous.

FIG. 5 shows a special case of operation of the FIG. 2 apparatus in which the main injection fuel is gaseous, with the needle 75 being raised by the injection of fluid into the pressure chamber 76. The gas fuel should be made available from a source at a sufficiently high pressure (e.g. 250 bars) to ensure proper diffusion via the nozzle orifices 85. However, if such a source is not available, there is no point in raising the main injection needle, and it should be prevented from rising at all. The abutment 4 is then adjusted in such a manner that the piston 2 continuously closes the orifice 9, and the orifice 21 is located, relative to the abutment 4, in such a manner as to ensure that it is never closed by the piston 2. The abutment 3 is adjusted so that the orifice 19 is constantly open. This adjustment of the two abutments provides communication between the main volume and the pilot volume. Pilot injection and main injection are then replaced by a single injection which takes place via the needle 74 and the orifices 88. This requires the fluid supplied by the high-pressure pump 1A to be fuel.

The various operating conditions described above depend on the load to which the engine is subjected, and the positions of the cams 5 and 6 may be controlled as a function of engine operating parameters such as speed, torque, admission air pressure, cooling fluid temperatures, combustion conditions, etc.

Naturally, the metering pump 30 may either be separate from or integrated with a block including the high-pressure pump 1A, and the injector blocks 40 or 60 may be constituted by pairs of separate injectors.

I claim:

1. An injector apparatus for an internal combustion engine, the apparatus being capable of injecting two fuels, namely a "pilot injection" liquid fuel and a "main injection" liquid or gaseous fuel, the injector apparatus comprising a low-pressure pump for pilot injection fuel feed, a high-pressure injection-type pump, two fuel injectors, and a metering pump selectively connecting the low-pressure pump, the high-pressure pump, and the two fuel injectors, said metering pump including a transfer piston with one of its faces delimiting a main volume in permanent communication with the high-pressure pump and with its other face delimiting a pilot volume in permanent communication with the low-pressure pump and with the pressure chamber of the pilot injection needle, the injector apparatus including the improvement of two independently-adjustable abutments each of which limits the stroke of said piston in a respective direction, with an extreme position of the main volume abutment preventing the transfer piston from covering an orifice putting the main volume into communication with the pressure chamber of the main injector needle, and with an abutment position of the pilot volume serving to block the transfer piston.

2. An injector apparatus for an internal combustion engine, the apparatus being capable of injecting two fuels, namely a "pilot injection" liquid fuel and a "main injection" liquid or gaseous fuel, the injector apparatus comprising a low-pressure pump for pilot injection fuel feed, a high-pressure injection-type pump, two fuel injectors, and a metering pump selectively connecting the low-pressure pump, the high-pressure pump, and the two fuel injectors, said metering pump including a transfer piston with one of its faces delimiting a main volume in permanent communication with the high-pressure pump and with its other face delimiting a pilot volume in permanent communication with the low-pressure pump and with the pressure chamber of the pilot injection needle, the injector apparatus including the improvement of two independently-adjustable abutments limiting the stroke of said piston in respective directions, with an extreme position of the main volume abutment preventing the transfer piston from covering an orifice putting the main volume into communication with the pressure chamber of the main injection needle, and a position of the pilot volume abutment enabling the piston to move over a certain stroke.

3. An injector apparatus according to claim 1 or claim 2, wherein the main injection fuel is a liquid fuel, and wherein the active sections subjected to the control pressure for raising the pilot injection needle and the main injection needle are identical, with both needles being pressed against their seats by a common rating element.

4. An injector apparatus for an internal combustion engine, the apparatus being capable of injecting two fuels, namely a "pilot injection" liquid fuel and a "main injection" gaseous fuel, the injector apparatus comprising a low-pressure pump for pilot injection fuel feed, a high-pressure injection-type pump, two fuel injectors, and a metering pump selectively connecting the low-pressure pump, the high-pressure pump, and the two fuel injectors, said metering pump including a transfer piston with one of its faces delimiting a main volume in permanent communication with the high-pressure pump and with its other face delimiting a pilot volume in permanent communication with the low-pressure pump and with the pressure chamber of the pilot injection needle, the injector apparatus including the improvement of two independently-adjustable abutments limiting the stroke of said piston in respective directions, and the metering pump including two orifices and a duct putting the two volumes controlled by the piston into communciation with each other, with an extreme position of the main volume abutment and an extreme position of the pilot volume abutment putting these two volumes into permanent communication so that the transfer piston then prevents communication between the main volume and the pressure chamber of the main injection needle.

5. An injector apparatus according to claim 4, wherein the main injection needle includes a set of ducts putting the pressure chamber and a leak return circuit into communication when the needle is in a raised position.

6. An injector apparatus according to claim 4 or 5, wherein a duct provided with a non-return valve enables fluid to flow from the pressure chamber of the main injection needle towards the high-pressure pump so as to empty the pressure chamber.

7. A metering pump for an injector apparatus for an internal combustion engine, said injector apparatus being capable of injecting two fuels, namely a "pilot injection" liquid fuel and a "main injection" liquid or gaseous fuel, the metering pump including a transfer piston with one of its faces delimiting a main volume in permanent communication with the high-pressure pump and with its other face delimiting a pilot volume in permanent communication with the low-pressure pump and with the pressure chamber of the pilot injection needle, wherein the metering pump is constituted by a body having a bore therein along which said piston slides between two abutments, each abutment being capable of sliding along the bore in order to adjust the stroke of the piston and each abutment including its own position-adjusting means.

8. A metering pump according to claim 7, wherein the main injection fuel is a gaseous fuel, and wherin the metering pump includes an orifice capable of being put into communication with the main volume, an orifice capable of being put into communication with the pilot volume, and a duct interconnecting said orifices.

9. An internal combustion engine fitted with an injector apparatus and a metering pump according to any preceding claim.

* * * * *